United States Patent Office

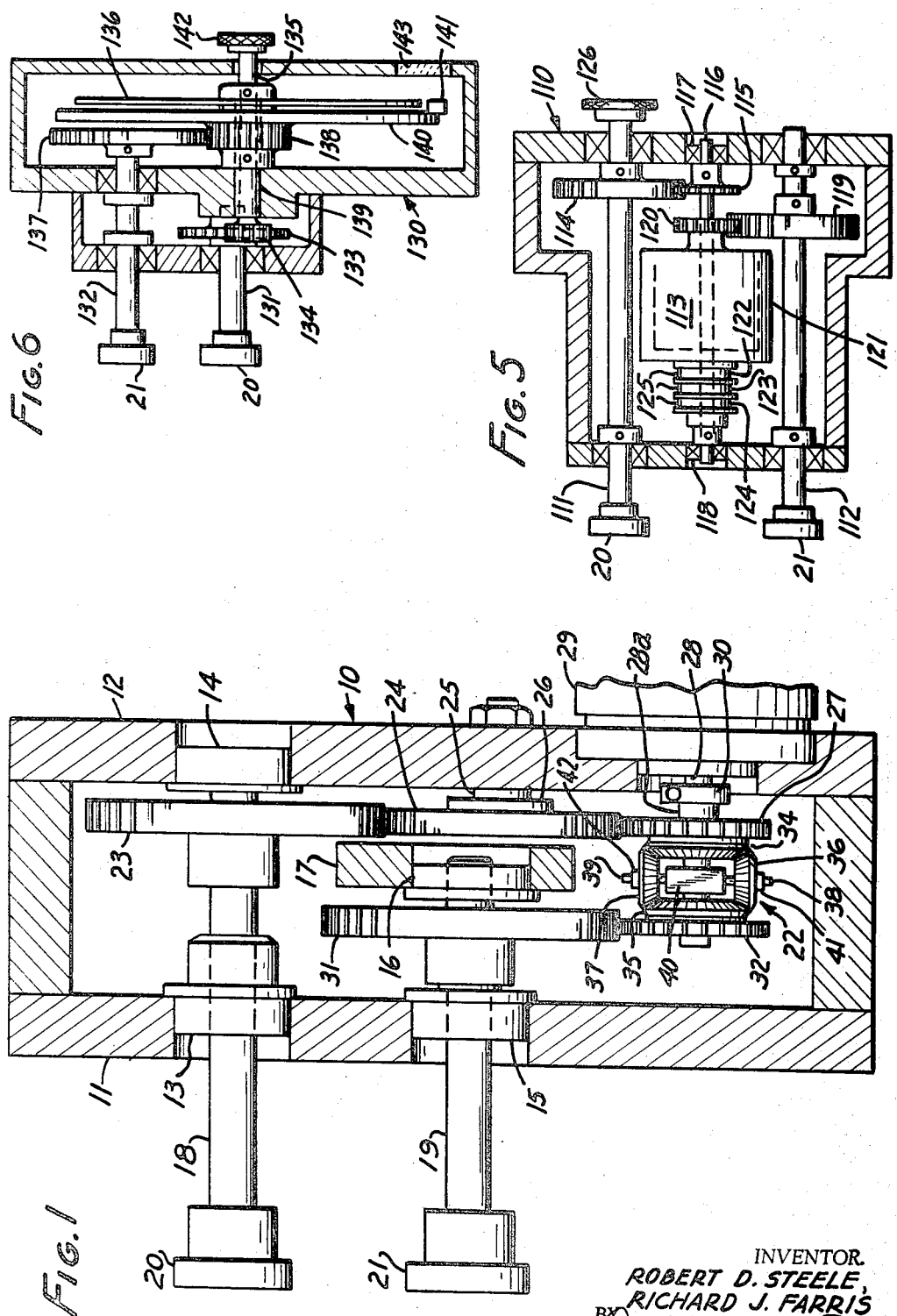

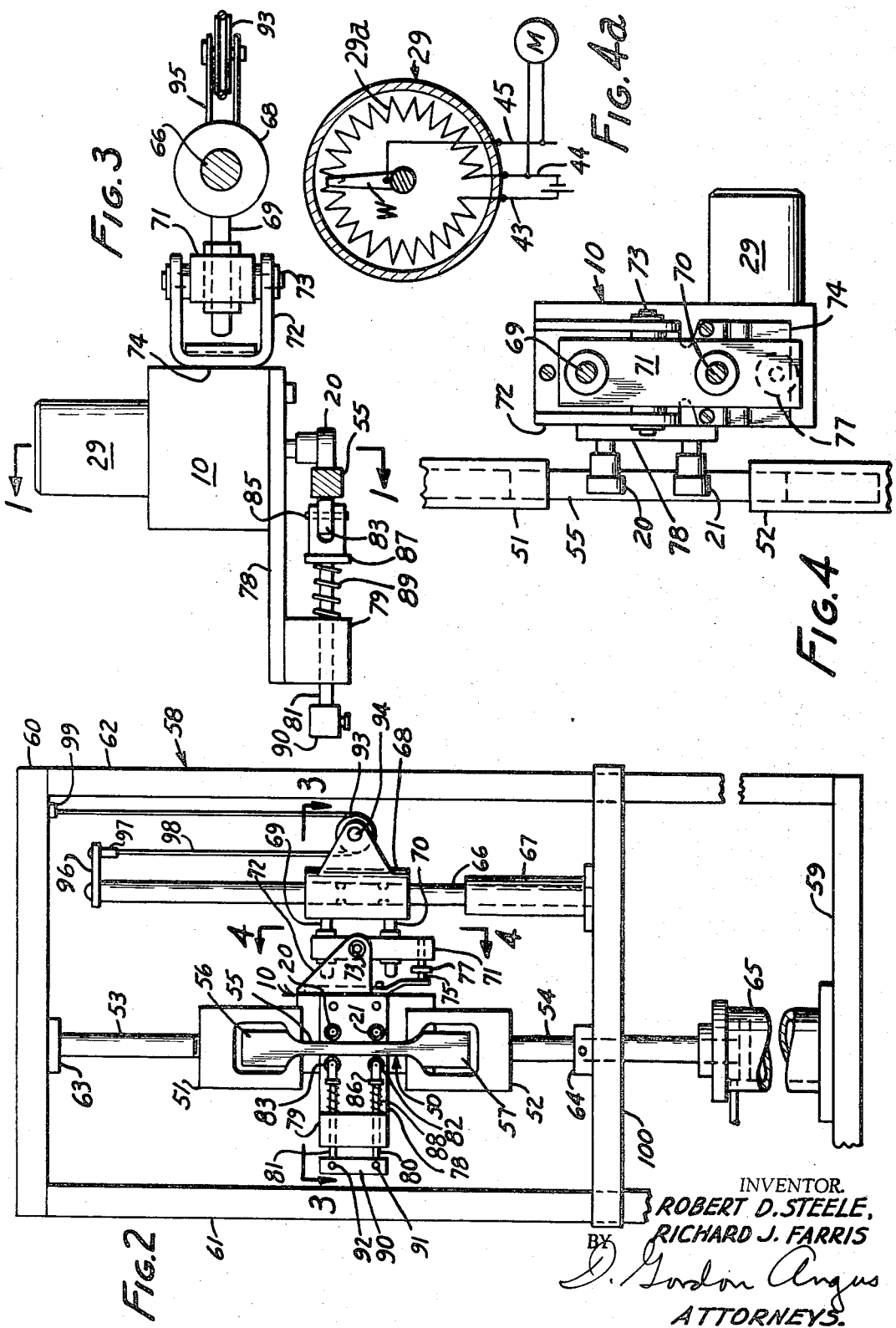

3,416,233
Patented Dec. 17, 1968

3,416,233
EXTENSOMETER AND ATTACHMENT
Robert D. Steele, El Dorado, and Richard J. Farris, Citrus Heights, Calif., assignors to Aerojet General Corporation, El Monte, Calif., a corporation of Ohio
Filed Nov. 4, 1966, Ser. No. 592,018
1 Claim. (Cl. 33—147)

This invention relates to strain measurement and has for an object to permit direct and continuous measurements of strains in specimens being deformed.

A related object is to provide for the specimen being tested, freedom from measurement errors due to its supporting means.

A further related object is to provide simple means for reading the elongation.

A common technique heretofore used to measure strain has been to assume that the specimen has a given gauge section, the strain then being defined as the change in length divided by the length of the gauge section. This technique has frequently been subject to substantial errors due to various factors such as gauge sections which are not constant or variations in specimen holding techniques or specimen geometry. Other methods heretofore used have have included optical methods such as the use of cathotometers, photographs or moire fringes to measure the section. Such methods, although precise, are intermittent, time consuming and require considerable data reduction.

It has heretofore been proposed to overcome the foregoing disadvantages of prior known techniques of strain measurement by placing in contact with the specimen being deformed, a pair of friction wheels spaced apart such that the wheels are rotated by the straining of the specimen. In such arrangement, the algebraic sum of the wheel rotations is a measure of the strain. In this prior known use of such friction wheels, however, the measurements have been subject to error due to frictional and other effects due to attachment of the specimen of its support. Furthermore, in the prior known use of such friction wheels, the readout system by which the strain is measured or recorded, has been complicated in that it has required the use of electrically operated servomechanism.

The present invention is an improvement over prior known arrangements in that provision is made for gently floating the friction wheels in relation to the test specimen in a manner to avoid measurement errors due to the supporting equipment for the friction wheels even though the test specimen be relatively weak and ductile.

Further features of the present invention involve simplified means for reading the strains. According to one feature, a mechanical differential system is connected with the friction wheels in a manner to read out the strain directly on an indicating device for example, a potentiometer.

In accordance with alternative forms of readout devices, separate and related parts of an indicator mechanism, for example, a pointer and dial, or two relatively movable parts of a potentiometer, are attached or connected with the respective friction wheels.

This method and means of operation based on the principle of measurement of the difference in rotation of two friction wheels that ride on the surface of the specimen and maintained in contact with the surface of the test specimen by a free floating support system that enables the position of the friction wheels to accommodate to the position and condition of the test specimen, indicates directly the true strain; and relatively simple recording equipment may directly read the strain. Furthermore, the range of strain within which a device can be operated in this maner is unlimited; hence strains as high as 1000% and as low as 0.2% can be measured accurately. Moreover, this equipment or extensometer does not affect the stress-strain properties of the specimen, as very low contact pressure and torques are required to operate the instrument. A further advantage is that the instrument is relatively inexpensive and well suited for routine as well as reseach test applications.

The foregoing and other features of this invention will be better understood from the following detailed description, and the accompanying drawings, of which:

FIG. 1 is a cross-section view of an extensometer arrangement according to the present invention;

FIG. 2 shows the extensometer of FIG. 1 in operating relationship with a tension producing mechanism according to this invention;

FIG. 3 is a cross-section view taken at line 3—3 of FIG. 2;

FIG. 4 is a cross-section view taken at line 4—4 of FIG. 2; and FIG. 4a shows an electrical arrangement in the potentiometer in FIGS. 1 and 4;

FIG. 5 is a cross-section view of an alternative form of extensometer arrangement according to the present invention; and FIG. 6 is a cross-section view of still another form of extensometer according to the present invention.

Referring to FIGS. 1 to 4 of the drawings, the extensometer comprises a housing 10 in the form of a gear box having two opposite sides 11 and 12, into which are positioned a pair of oppositely-located aligned bearings 13 and 14, respectively. At some distance from bearings 13 and 14 there is another pair of opposite aligned bearings 15 and 16, respectively, the bearing 15 being mounted in side 11 and bearing 16 being mounted in a supporting frame 17 fixed to the main frame 10. Parallel shafts 18 and 19 are journaled respectively through bearings 13, 14 and bearings 15, 16 and on the outer ends of these two shafts there are fastened respective friction wheels 20 and 21 aligned with each other in the same vertical plane which is parallel to the wall 11 of the gear box housing and at some distance in front of the housing. The two shafts 18 and 19 are meshed or correlated to each other through a differential gear assembly 22 in the following manner:

A drive gear 23 fastened on shaft 18 within the housing meshes with an idler gear 24 mounted on a pin 25 fixed through the housing and extending into the interior thereof and supporting a bearing 26 on which the idler gear 24 is free to rotate. The idler gear 24 meshes with a gear 27 which idles on a hollow shaft 28a which receives within it the end of a shaft 28 from a suitable readout instrument 29. A clamp 30 serves to clamp shafts 28 and 28a together, the shaft 28 being parallel to shafts 18, 19 and 25. The shaft 19 has fastened to it a drive gear 31 which meshes with gear 32 which also idles on shaft 28.

The differential gear assembly is of a well known type comprising a pair of oppositely located bevel gears 34 and 35, herein referred to as differential gears, the gear 34 being fixed to the gear 27 and the gear 35 being co-axial therewith and fixed to gear 32, the gears 27, 32, 34 and 35 all being free to rotate on shaft 28. The other opposite bevel gears 36 and 37, hereinafter referred to as interconnecting gears, are mounted respectively on pins 38 and 39 extending from a block or spider 40 which is fixed on shaft 28. The block or spider 40 acts as a supporting member which supports the interconnecting gears 36 and 37 by supporting their pins. Suitable locking means such as nuts 41 and 42 on respective pins 38 and 39 serve to hold the bevel gear assembly together with the teeth of gear 36 meshing with the teeth of both gears 34 and 35, and the teeth of gear 37 also meshing with the teeth of gears 34 and 35.

The instrument 29 can be any suitable type which gives a reading of the angular rotation of shaft 28 from its normal zero reading. It can conveniently be a rotary potentiometer of a type in which the turning of shaft 28 varies the electrical resistance of a potentiometer resistance in the form of a spiral winding 29a arranged concentrically around shaft 28 and supported by the potentiometer casing, which is fixed to the gear housing. This will give a meter reading in a well-known manner which is proportional to the angular rotation of the shaft 28. To do this there are provided wires 43 and 44 which are electrical leads from the opposite ends of the potentiometer resistance across which is connected a voltage, and lead 45 is the lead to the wiper arm W which rotates with the shaft, making contact with the spiral winding of the resistor element. The voltage, as indicated by the meter M, between one resistor terminal and the wiper arm, indicates the angular rotation of the potentiometer shaft, since the spiral resistance winding is uniformly wound around the shaft.

FIG. 2 shows the gear box and potentiometer of FIG. 1 being used to measure the strain of a specimen being subjected to tensile stress in test equipment. A test specimen 50 is shown mounted in jaws 51 and 52 of a testing machine which comprises a pair of co-linear spaced rods 53 and 54, each of which has mounted on its end one of the jaws 51 and 52. According to a common practice, the specimen is formed with a length of a uniform gauge section 55 extending between two heads 56 and 57 shaped to be held by the respective jaws 51 and 52. According to well-known operation of such tension testing equipment, the bars or rams 53 and 54 are drawn apart from each other to stress the specimen 50 in tension, resulting in elongation of the uniform test section 55.

The straining of such a specimen is commonly done in a tension machine which can comprise essentially a rigid frame 58, having a horizontal bottom bar or beam 59 acting as a footing, and an upper horizontal bar or beam 60, joined together by vertical side beams 61 and 62. The upper rod 53 is fastened in a suitable attaching means or hub 63, fixed to the upper beam 60, and the lower rod 54 is similarly fastened in a suitable attaching means or hub 64 fixed to a horizontal bar 100. The bar 100 is slidable up or down along the vertical beams 61 and 62, and the vertical position of movable bar 100 is controlled by a suitable mechanism such as a hydraulic ram 65. When the hydraulic ram is powered, as by pumping hydraulic fluid into its cylinder above its piston, its pressure causes the bar 100 to move downwardly and thereby apply tension to stretch the specimen 50. Ordinarily such a tension-applying machine is provided with means for measuring the tensile load (not shown in the drawing).

In the use of the equipment, the housing 10 is mounted in operative relation with the tension-applying equipment, such that the friction wheels 20 and 21 are held against the test section 55 and in frictional engagement therewith. The mounting should be such that the friction wheels are maintained in position at approximately the center of the uniform section 55 even though this section has elongated considerably under tension.

This mounting equipment comprises a vertical rod 66 having its lower end fastened within a hollow support 67, which is fastened to the base 59 of the test frame. A sleeve 68 is mounted on rod 66 at a position opposite the specimen 50 such that the sleeve is slidable up and down on the rod and is also freely rotatable on the rod. A pair of cylindrical members 69 and 70 spaced somewhat apart from each other and parallel to each other protrude laterally toward the test piece from sleeve 68 into which they are fixed. There is mounted on the cylinders 69 and 70 a bar 71, provided with holes through it matching the diameters of cylinders 69 and 70 and easily slidable on the cylinders, so that the bar can freely move toward or away from the test specimen 50. A bracket 72 is pivoted at a pivot pin 73, passing through this bar, and the base 74 of the bracket is fastened securely to the housing of the gear box 10. The positioning and dimensions of these elements for mounting the gear box 10 are such that the gear box is supported in relation to the test specimen 50 so that the friction wheels 20 and 21 are brought into contact with the portion 55 of the specimen. Since the weight of the gear box 10 would tend to cause it to pivot counterclockwise (with reference to FIG. 2) on pivot pin 73, this tendency is overcome by provision of a pin 75 threaded at one end to thread into a threaded hole in bar 71, the opposite end of the pin being in contact with the end of the base portion 74 of the bracket 72. Thus, by turning thumb wheel 77, which is integral with the pin, the position of the pin in contact with the lower end of member 74 can be adjusted so that the frictional pressure of both friction wheels 20 and 21 against the specimen is substantially the same.

For the purpose of maintaining the friction wheels in contact with section 55 of the test specimen, there is attached to the frame of the gear box 10 a strip 78 having mounted at its end opposite the bracket 72, a block 79 through which are passed rods 80 and 81, slidable through holes through the block. These rods are spaced somewhat and are parallel to each other, and perpendicular to the section 55 of the test specimen. The ends of the rods nearest the test specimen are provided with respective wheels 82 and 83 which idle on pins 84 and 85 attached to respective rods 80 and 81. These rods are provided with respective flanges 86 and 87, and springs 88 and 89 compressed between these flanges and the block, on the respective rods, serve to urge the idler wheels 82 and 83 into contact with the test specimen in a manner to maintain the friction wheels 20 and 21 in contact with the opposite side of the specimen at all times during the test.

For the purpose of maintaining the friction wheels 20 and 21 at a central position of the portion 55 of the test specimen, there is provided a pulley wheel 93 mounted to idle freely on a pin 94 attached to an offset 95 of the sleeve 68. At the upper end of rod 66 there is fastened an arm 96 carrying a depending pin 97 offset sufficiently from rod 66 so that a cable 98 having one end attached to pin 97 extends vertically downward to pass around the pulley wheel 93 and then up vertically to attach to a pin 99 fastened to the upper frame member 60. The looping of the cable around the pulley wheel 93 supports the sleeve 68 and establishes the vertical position of this sleeve on the rod 66. The arrangement is such that the sleeve 68 moves downwardly at one-half the rate at which the lower jaw 52 and rod 54 of the test mechanism move downwardly. This causes the friction wheels 20 and 21 to maintain their position at the center of the gauge section 55 through all degrees of elongation of the test specimen.

This mounting arrangement of the gear box housing 10 facilitates application of the friction wheels to the test specimen and enables the friction wheels to maintain the same degree of frictional contact for all conditions that occur during the elongation of the test specimen, and allows these friction wheels to set themselves in their proper position and with the proper degree of frictional engagement.

While a test specimen is being placed in the jaws the friction wheels can be rotated away from the specimen, by rotating sleeve 68; and then rotated back to the specimen while wheels 83 and 84 are withdrawn from the position of the specimen by pulling on bar 90. Release of bar 90 produces the desired engagement of the friction wheels. During this mounting operation, adjustment of the thumbscrew 77 can be made.

The box 10 has freedom of movement in all directions, and the test section gear box may be said to be in a floating condition relative to each other. This results from the fact that the sleeve 68 is freely rotatable on the shaft 66 so that the box can adjust itself in the rotational direction. The fact that bar 71 is slidable on its cylindrical bearings 69 and 70 insures that the two friction wheels 20 and 21 will always be maintained in contact with the test specimen even while the cross-section of the specimen is becoming smaller as it elongates. The pivoting of bracket 72 on pin 73 insures that the position of the gear box will be self-adjusting so that both friction wheels 20 and 21 will be maintained in contact with the test specimen.

It is noted that the surfaces of the friction wheels which bear on the specimen are cylindrical. This pre-supposes that the surface of the test specimen on which they bear, will be planar, as in a conventional square cross-section. If specimens with a round cross-section are used it will be desirable to use frictional wheels with correspondingly concave surfaces.

When the test section elongates under stress, the wheels 20 and 21 rotate correspondingly to rotate the shafts 18 and 19. This rotation is transferred through the gear chain to the gears 28 and 32 to act upon the differential gear assembly 22. So long as the friction wheels 20 and 21 rotate to exactly the same angular degree, there is no relative motion between them, and consequently no turning of shaft 28. When, however, the two friction wheels 20 and 21 have relative motion between them, as for example, if one rotates in one direction while the other rotates in the other direction, or if one of them turns to a greater angular degree than the other, there will be a turning of shaft 22 and a consequent reading on the instrument 29.

The principle of operation of the extensometer is therefore based on the measurement of the difference in rotation of the two friction wheels. These friction wheels being a fixed distance apart monitor the deformation of the surface beneath them at any instant, as distinguished from the measurement of the displacement of two points on the specimen as is done in the operation of most other types of extensometers. The differential continuously takes the algebraic difference of the two wheel rotations and outputs this difference as a single rotation of shaft 28.

While the readout instrument 29 is a rotary potentiometer as shown, it will be understood that other kinds of readout instruments such as those shown in other embodiments herein, could be used instead.

FIG. 5 shows another form of extensometer which can be used in place of the gear box 10 of FIGS. 1 to 4. The device of FIG. 5 comprises a housing 110 from which there protrudes the two friction wheels 20 and 21 which can be the same as the same numbered friction wheels in FIG. 1, and similarly spaced and arranged. Friction wheels 20 and 21 are mounted on respective shafts 111 and 112 which correspond with the shafts numbered 18 and 19 in FIG. 1. These shafts, instead of being connected with gears which operate a differential gear arrangement as in FIG. 1, are geared to a potentiometer 113 mounted within the housing. This is done in the following manner:

Shaft 111 has fixed to it a drive gear 114 which meshes with an input gear 115 mounted on the potentiometer shaft 116 which supports the potentiometer within the housing by reason of being journaled at its opposite ends in bearings 117 and 118 which are fixed to the housing 110. Thus, the rotation of wheel 20 produces rotation of the potentiometer shaft 116 which carries the electrical wiper within the potentiometer which makes contact with the spiral electrical resistance winding of the potentiometer, as described in connection with FIGS. 1 and 4a. The other drive shaft 112 has attached to it a drive gear 119 which meshes with a gear 120 attached to the casing 121 of the potentiometer, the central portion of gear 120 having an opening through it through which the potentiometer shaft 116 passes but without engaging. Thus, rotation of friction wheel 21 rotates the potentiometer casing, and since the spiral resistor of the potentiometer is mounted to the casing this produces relative movement between the potentiometer wiper arm and the potentiometer resistor.

Since both the potentiometer casing and the potentiometer shaft are rotatable relative to the housing 110, provision for making electrical connections to the ends of the potentiometer resistance winding, and to the potentiometer wiper arm, is provided in the form of three slip rings 122, 123 and 124. Two of these slip rings, for example, 122 and 123, are fastened to the casing, although electrically insulated therefrom and from each other, and are electrically connected to the ends of the spirally wound potentiometer resistor which is attached to the casing, although insulated therefrom. The third slip ring 124 is insulated from the other slip rings and is fastened to the potentiometer shaft 116 and is electrically connected to the potentiometer wiper arm within the potentiometer casing. Suitable slip ring wipers 125 make contact with respective ones of the slip rings, and electrical leads are brought to the respective wipers for the three respective slip rings. Thus, by connecting voltage across the ends of the potentiometer resistance winding and by connecting a suitable meter such as a voltmeter between the potentiometer wiper arm and one terminal of the potentiometer winding, the meter reading can be taken as a measure of the amount of elongation of the test sample.

A thumb wheel 126 is attached to the end of shaft 111 opposite the friction wheel 20, for the purpose of turning the potentiometer shaft 116 to its zero value, prior to measuring elongation of the sample. The arrangement of FIG. 5 can be used in the test machine of FIG. 2 in the same manner as was the gear box 10, it being understood that the housing 110 of FIG. 5 corresponds with the housing 10 of FIG. 2. Thus, the bracket 72 of FIG. 2 can be similarly attached to the housing 110 in such a manner that when attached to the pivot pin 73 of FIG. 2, the friction wheels 20 and 21 will rest against the test sample. Similarly the plate 78 with its block 79 and wheels 83 and 84 will be attached to the side of the housing 110 in a manner analogous to that of FIG. 2.

FIG. 6 shows another readout arrangement in a housing which can be used instead of the housing 10 or the housing 110 of FIGS. 2 and 5 respectively. Referring to FIG. 6, the mechanism is mounted in a housing 130, and the friction wheels which may be the same as the same numbered friction wheels in the preceding figures and similarly spaced apart and mounted on parallel shafts 131 and 132, which correspond respectively with shafts 18 and 19 of FIG. 1, are journaled into the housing. Shaft 131 has fastened to it within the housing an input gear 133 which meshes with a pinion 134 mounted on a shaft 135 which has fastened to it within the housing an input gear 137 which meshes with a gear 138 mounted on a hollow shaft 139 freely rotatable over and relative to the shaft 135. There is attached to the gear 138 an arm which may be a circular member 140 which carries a pointer 141.

Inspection of the figures shows that rotation of friction wheel 20 produces rotation of the dial 136 and that rotation of friction wheel 21 produces rotation of the pointer 141, both relative to the housing 130.

In the use of this device, the housing 130 can be fitted to the tension machine of FIG. 2 in the same manner as housings 10 and 110 of FIGS. 1 and 5, respectively, as has been heretofore described.

The dial can be calibrated to read directly in terms of elongations around the circumference of the dial. For the purpose of setting the pointer at the zero mark of the dial, there is provided a zero knob 142 attached to shaft 135 outside the housing. In order to read the dial, the portion of the housing facing the dial figures should be transparent such as a Lucite window 143.

It will be recognized that by the present invention there is provided a relatively simple means for measuring elongations, and which is applicable to specimens having ductilities in a wide range. The form shown in FIG. 1, comprising the mechanical differential arrangement has been found especially useful for its versatility and its ability to read minute angular deflections. Although the indicating device has been described as being an electrical potentiometer, it is possible to substitute some other device, for example, the dial and pointer arrangement as shown in FIG. 6. As applied in the system of FIG. 1, either the pointer or the dial would then be maintained stationary relative to the gear box, while the other member would move.

The form of extensometer shown in FIG. 6 commends itself where relative simplicity is desired, this being provided by the simple dial and pointer arrangement shown therein. It will be found especially useful in such situations as long term creep tests.

The form of instrument shown in FIG. 5 will be found most useful for specific applications in general routine testing.

Although each embodiment of the invention will be found particularly advantageous under specific circumstances, the embodiment of FIG. 1 is selected as the preferred embodiment because of its versatility as well as its accuracy.

We claim:
1. In an extensometer having a pair of spaced friction wheels rotatable on parallel axes which engage the side of a test specimen, a support for said wheels, a differential gear assembly mechanically interconnecting the friction wheels and mounted on said support, said assembly comprising a pair of differential gears rotatable differentially relative to each other, a pair of interconnecting gears each interconnecting said differential gears, a supporting member mounted for rotary movement on said support, by which said differential and interconnecting gears are supported in a manner such that the differential and interconnecting gears are freely rotatable on the supporting member, an indicating means comprising a rotary shaft the angular position of which effects an indication, said rotary shaft being fixed to said supporting member, whereby the angular rotation of the shaft indicates the differential rotation of the friction wheels, and therefore the elongation of the part of the specimen between the friction wheels, said indicating means is an electrical potentiometer containing a resistance element, and the rotary shaft carries a wiper arm which wipes over said resistance element, the arm position being readable on a meter connected from the wiper arm to a point of said resistance element.

References Cited
UNITED STATES PATENTS

| | | | |
|---|---|---|---|
| 2,115,568 | 4/1938 | Becker | 235—61 |
| 2,650,432 | 9/1953 | Adams | 33—147 X |
| 2,756,590 | 7/1956 | Clifford et al. | 33—148 X |
| 3,065,415 | 11/1962 | Slamar | 33—147 X |
| 563,258 | 7/1896 | Connet. | |
| 1,728,904 | 9/1929 | Herr. | |
| 1,839,354 | 1/1932 | Spath. | |
| 2,462,846 | 3/1949 | Clark. | |

HARRY N. HAROIAN, *Primary Examiner.*